US012617665B2

(12) United States Patent
Brown et al.

(10) Patent No.: US 12,617,665 B2
(45) Date of Patent: May 5, 2026

(54) ADAPTER FOR BEVERAGE DISPENSER

(71) Applicant: WELBILT FOODSERVICE COMPANIES, LLC, New Port Richey, FL (US)

(72) Inventors: James Wallace Brown, Crestwood, KY (US); Roger Boydstun, Oklahoma City, OK (US)

(73) Assignee: WELBILT FOODSERVICE COMPANIES, LLC, New Port Richey, FL (US)

( * ) Notice: Subject to any disclaimer, the term of this patent is extended or adjusted under 35 U.S.C. 154(b) by 160 days.

(21) Appl. No.: 18/416,182

(22) Filed: Jan. 18, 2024

(65) Prior Publication Data

US 2024/0239644 A1 Jul. 18, 2024

Related U.S. Application Data

(60) Provisional application No. 63/439,629, filed on Jan. 18, 2023.

(51) Int. Cl.
*B67D 1/08* (2006.01)
*B67D 1/14* (2006.01)

(52) U.S. Cl.
CPC ......... *B67D 1/0888* (2013.01); *B67D 1/1405* (2013.01); *B67D 2210/00083* (2013.01)

(58) Field of Classification Search
CPC ................ B67D 1/0888; B67D 1/1405; B67D 2210/00083
See application file for complete search history.

(56) References Cited

U.S. PATENT DOCUMENTS 7,617,850 B1 11/2009 Dorney
8,408,255 B1 4/2013 Wade et al.
(Continued)

FOREIGN PATENT DOCUMENTS

WO 2004056695 A1 7/2004

OTHER PUBLICATIONS

International Search Report dated Apr. 30, 2024 for PCT Application No. PCT/2024/011972.
(Continued)

*Primary Examiner* — Donnell A Long
(74) *Attorney, Agent, or Firm* — Ohlandt, Greeley and Perle, LLP.

(57) ABSTRACT

The adapter of the present disclosure includes a circuit board with a processor and a switch thereon and a reader or transceiver connected to the board. With the adapter, a technician can retrofit an existing beverage machine to upgrade the dispensing and payment systems associated therewith. Existing beverage machines include a locking circuit that is key-enabled. This circuit allows an owner or technician to selectively allow and prevent beverage and/or ice from being dispensed. A technician can install the adapter of the present disclosure into the existing locking circuit. The board and transceiver of the adapter will detect when a user is authorized to obtain beverages, and close the circuit to enable this. To dispense beverage and/or ice, a user will present a valid credential to the board and transceiver. When no authorized user provides a valid credential, no beverage can be dispensed. The adapter can use a number of communication technologies to determine authorization. The adapter of the present disclosure can also include or work in conjunction with a mobile app on a user's device, that can check with a server to ensure that the user has paid for the beverage. A method of operating a beverage dispens-
(Continued)

ing machine and retrofitting a beverage dispensing machine is also provided.

19 Claims, 10 Drawing Sheets

(56) References Cited

U.S. PATENT DOCUMENTS

| | | | | |
|---|---|---|---|---|
| 8,972,048 | B2 | 3/2015 | Canora et al. | |
| 2009/0306818 | A1 | 12/2009 | Slagley et al. | |
| 2010/0005903 | A1* | 1/2010 | Beavis | B67D 1/0888 73/290 R |
| 2010/0036528 | A1* | 2/2010 | Minard | B67D 1/0078 235/487 |
| 2010/0200110 | A1* | 8/2010 | Segiet | G07F 13/10 141/94 |
| 2013/0341395 | A1* | 12/2013 | Chan | F25D 31/003 165/172 |
| 2016/0363921 | A1* | 12/2016 | Martindale | B67D 1/0888 |
| 2017/0101302 | A1* | 4/2017 | Quartarone | G07F 9/026 |
| 2017/0156540 | A1* | 6/2017 | Wheatley | B67D 1/0078 |
| 2017/0337535 | A1* | 11/2017 | Jones | G06Q 10/0833 |
| 2018/0093875 | A1* | 4/2018 | Steele | B67D 1/0888 |
| 2019/0151879 | A1* | 5/2019 | Cortland | H04B 5/79 |
| 2019/0300357 | A1 | 10/2019 | Crawford et al. | |
| 2021/0039942 | A1* | 2/2021 | Springer | B67D 1/06 |
| 2021/0081891 | A1* | 3/2021 | McLellan | G06Q 10/087 |
| 2021/0380392 | A1* | 12/2021 | Glucksman | B67D 1/0888 |
| 2022/0112068 | A1 | 4/2022 | Ljunggren et al. | |

OTHER PUBLICATIONS

Written Opinion dated Apr. 30, 2024 for PCT Application No. PCT/2024/011972.

* cited by examiner

ADAPTER FOR BEVERAGE DISPENSER

CROSS-REFERENCE TO RELATED APPLICATION

The present application claims the benefit under 35 U.S.C. § 119 of U.S. Provisional Application Ser. No. 63/439,629, filed on Jan. 18, 2023, which is herein incorporated by reference.

BACKGROUND OF THE DISCLOSURE

1. Field of the Disclosure

The present disclosure relates to an adapter for and method of retrofitting beverage dispensers. More particularly, the present disclosure relates to an adapter including a switch that prevents a beverage from being dispensed unless a customer presents a credential that actuates the switch, allowing for the beverage to be dispensed.

2. Discussion of the Related Art

Beverage machines are used in restaurants, fast food establishments, convenience stores, and other businesses. They allow a customer to place a cup under a spout to receive a beverage. Typically, the customer will push the cup against a lever or switch, and the beverage machine will allow for a beverage to be dispensed into the cup. The beverage is typically a mixture of fluids, such as water, carbonated water, and/or flavor syrups. These beverage machines may commonly be known as "carbonated soft drink", or CSD machines.

Most of the existing beverage machines use disposable paper or plastic cups. There is an increasing desire to do away with disposable cups and move toward dispensers that work with reusable cups. Further, the business owners where beverage machines are used increasingly want a system of flexible payment, such as eliminating the need for a cash register transaction. However, there are thousands of beverage machines in the field that do not have the ability to be modernized in this way. Owners would therefore have to replace these machines entirely. The present disclosure addresses these issues.

SUMMARY OF THE DISCLOSURE

The present disclosure provides an adapter or assembly that allows existing, conventional beverage machines to be adapted for more desirable qualities. Beverage machines have a feature that may be known as a "key switch". As discussed in greater detail below, the key switch includes a key port that is typically on an external side of the beverage machine, wiring that is in communication with the valves in the machine that allow the beverage to be dispensed, and a switch. The key port allows a technician or owner to insert a key and selectively activate and disrupt the circuit that allows for the beverage to be dispensed. When the key port is in a first position, the circuit is closed and a customer can fill a cup. When the key is in the second position, the circuit is broken, the electrical signal to the valves that dispense the beverage is disrupted, and the machine does not allow for beverages to be dispensed.

The adapter of the present disclosure takes advantage of this feature of current beverage machines and provides a cost-effective way to retrofit the beverage machine for more advanced features. The adapter accesses the existing key switch circuit on beverage machines. The adapter comprises a circuit board, a processor with a program stored thereon, a splash panel, a transceiver or reader (hereinafter "reader" to distinguish from whatever credential the user provides, discussed below) on or in communication with the circuit board, and terminals to connect to the key switch of the machine. The reader can pair with a credential provided by a customer. The reader can detect a valid credential, thus activating the valves for a period of time to allow the paid customer to dispense ice and beverage. If no credential is presented to the reader (for example if a customer attempted to fill a plastic or paper cup), no beverage and/or ice can be dispensed.

Accordingly, in one embodiment, the present disclosure provides a beverage dispensing machine, comprising: a powered line; a neutral line; a valve connected to each of the powered line and the neutral line; a beverage dispensing nozzle in fluid communication with the valve; a circuit board, wherein the powered line is connected to the circuit board at a first point, and the neutral line is connected to the circuit board at a second point; a switch on the circuit board; a reader connected to the circuit board; an electrical circuit comprising the valve, the powered line, the neutral line, the circuit board, and the switch; and a processor on the circuit board. The reader is configured to read a credential provided by a user. The processor is configured to receive the credential from the reader and compare the credential to a set of approved credentials. If the credential matches one of the approved credentials, the processor is configured to set the switch to a closed position, thereby closing the electrical circuit and allowing beverage to flow through the valve and the beverage dispensing nozzle. If the credential does not match one of the approved credentials or no credential is presented to the reader, the processor is configured to set the switch to an open position, thereby opening the electrical circuit and not allowing beverage to flow through the valve and the beverage dispensing nozzle.

In another embodiment, the present disclosure provides a method of operating a beverage dispensing machine. The machine comprises: a powered line; a neutral line; a valve connected to each of the powered line and the neutral line; a beverage dispensing nozzle in fluid communication with the valve; a circuit board, wherein the powered line is connected to the circuit board at a first point, and the neutral line is connected to the circuit board at a second point; a switch on the circuit board; a reader connected to the circuit board; an electrical circuit comprising the valve, the powered line, the neutral line, the circuit board, and the switch; and a processor on the circuit board. The method comprises the steps of: presenting a credential to the reader; communicating the credential from the reader to the processor; comparing the credential to a to a set of approved credentials; if the credential matches one of the approved credentials, setting set the switch to a closed position, thereby closing the electrical circuit and allowing beverage to flow through the valve and the beverage dispensing nozzle; and if the credential does not match one of the approved credentials, setting the switch to an open position, thereby opening the electrical circuit and not allowing beverage to flow through the valve and the beverage dispensing nozzle.

In another embodiment, the present disclosure provides a method of retrofitting a beverage dispensing machine, the machine comprising: a powered line; a neutral line; a valve connected to each of the powered line and the neutral line; a beverage dispensing nozzle in fluid communication with the valve; and a keyport. Each of the powered line and the neutral line are connected to the keyport. The keyport has a first position and a second position, wherein in the first position the powered line, the neutral line, the valve, and the beverage dispensing nozzle complete a first circuit, and in the second position, the first circuit is disrupted. The method comprises the steps of: disconnecting each of the powered line and the neutral line from the keyport; connecting the powered line to a circuit board at a first point; connecting the neutral line to the circuit board at a second point, wherein the circuit board has a switch thereon and a reader connected thereto; and forming a second circuit comprising the valve, the powered line, the neutral line, the circuit board, and the switch. The reader is configured to read a credential provided by a user. The processor is configured to receive the credential from the reader and compare the credential to a set of approved credentials. If the credential matches one of the approved credentials, the processor is configured to set the switch to a closed position, thereby closing the second circuit and allowing beverage to flow through the valve and the beverage dispensing nozzle. If the credential does not match one of the approved credentials or no credential is presented to the reader, the processor is configured to set the switch to an open position, thereby opening the second circuit and not allowing beverage to flow through the valve and the beverage dispensing nozzle.

In another embodiment, the present disclosure provides an adapter comprising a circuit board, a switch on the circuit board, a reader in communication with the circuit board, and a processor on the circuit board. The processor is configured so that when it detects the presence of a valid credential, it changes the switch from an open state to a closed state.

DETAILED DESCRIPTION OF THE DISCLOSURE

Figure 1:
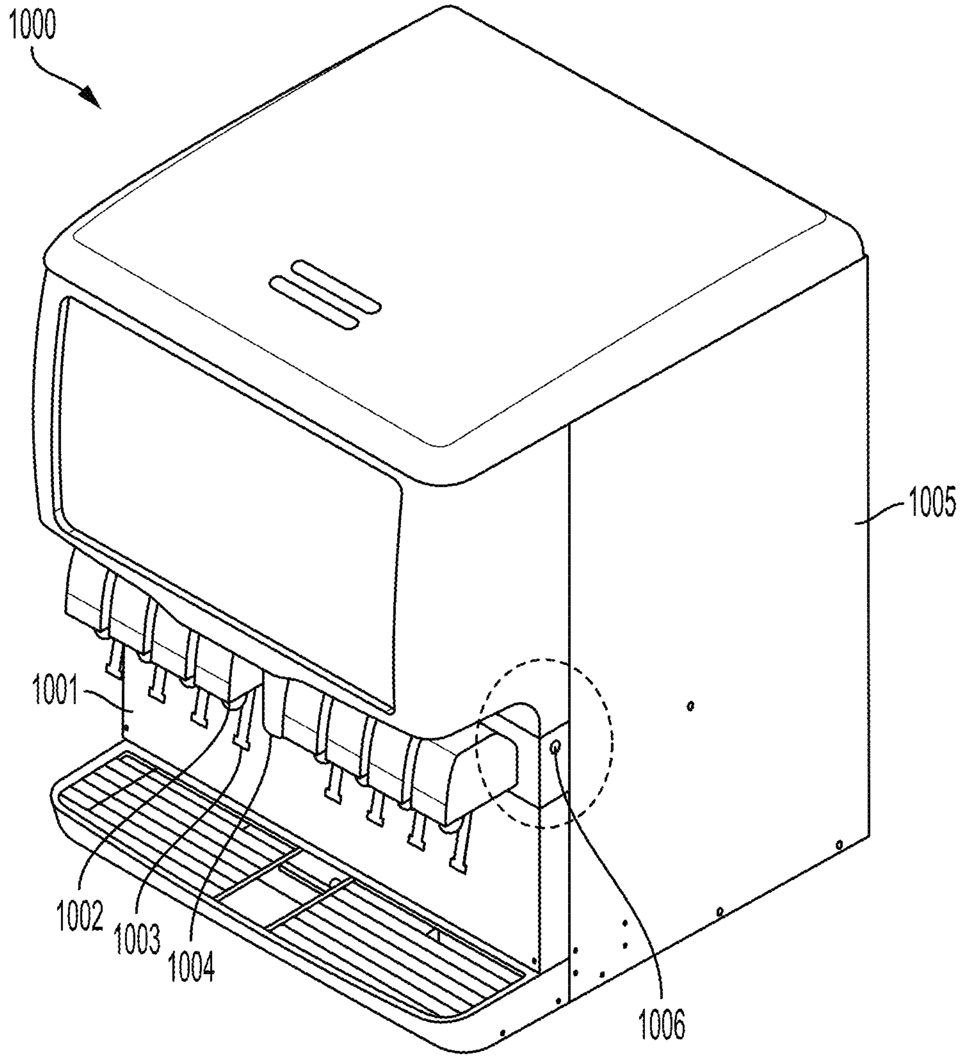
FIG. 1 PRIOR ART
FIG. 1 shows a beverage machine of the prior art.

Referring to FIG. 1, a beverage dispenser 1000 of the prior art is shown. Dispenser 1000 has splash panel 1001, a plurality of dispensing spouts 1002, a plurality of dispensing levers 1003, an ice dispensing spout 1004, a housing 1005, and a key port 1006. Each of dispensing spouts 1002 is connected to a different flavor source 1009. A customer or user places a cup under a desired one of dispensing spouts 1002. Depressing the associated one of levers 1003 allows for the beverage to flow through spout 1002 and into the cup. Ice can be obtained from spout 1004 in a similar manner. Valve mechanisms 1010 that allow for a beverage to be dispensed from spouts 1002 are within housing 1005.

Figure 2:
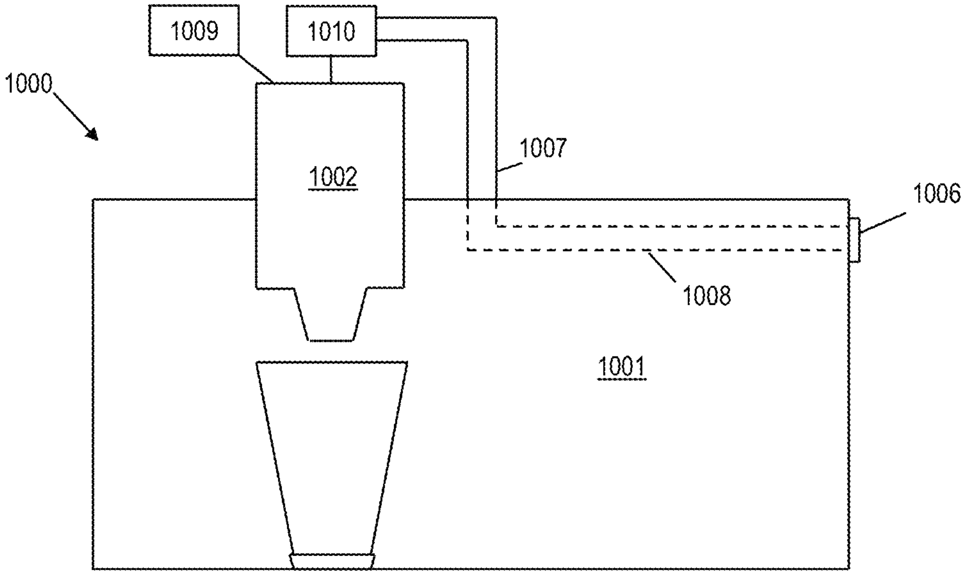
Fig. 2 (PRIOR ART)
FIG. 2 shows a schematic of a front view of a beverage dispensing machine according to the prior art.

FIG. 2 shows a simplified and schematic drawing of beverage machine 1000 of the prior art. An internal circuit provides power and connects spout 1002 and valve mechanisms 1010 to port 1006 via lines 1007 and 1008. One of lines 1007 and 1008 is connected to a source of power, for example 120 VAC. (This can be known as the "hot" line.) The other of lines 1007 and 1008 is a neutral line. Lines 1007, 1008 and a ground G can be delivered to a transformer, where the power is stepped down to a more suitable level for use in machine 1000, for example 24 VAC. When an operator inserts a key (not shown) into port 1006, the key can be rotated from a first position to a second position. In the first position, the internal circuit is closed or complete, meaning that a user can dispense beverages as described above. Port 1006 breaks the hot line, in the shown embodiment line 1008, when the key is rotated to the second position. In this second position, the internal circuit is broken and open, which cuts power to and prevents the dispensing of beverages through spout 1002.

Referring to FIGS. 3-6, adapter 1 of the present disclosure and how it interfaces with a beverage dispenser are shown. Advantageously, adapter 1 can be retrofitted to existing beverage dispensers. As discussed above, current beverage dispensers (e.g. dispenser 1000) have a circuit that is attached to a key port (e.g. 1006) that allows an owner of dispenser 1000 to selectively prevent dispenser 1000 from providing ice and beverage to a user. Adapter 1 of the present disclosure allows for the owner or technician (i.e., installer) to close an existing circuit in a different way. With adapter 1 of the present disclosure, the owner or technician does not have to modify any wiring or programming of the existing beverage machine 1000 except to interrupt an existing circuit and install the components described herein. Nor do owners of existing beverage dispensers need to buy completely new machines to have the functionality described herein.

Figure 3:
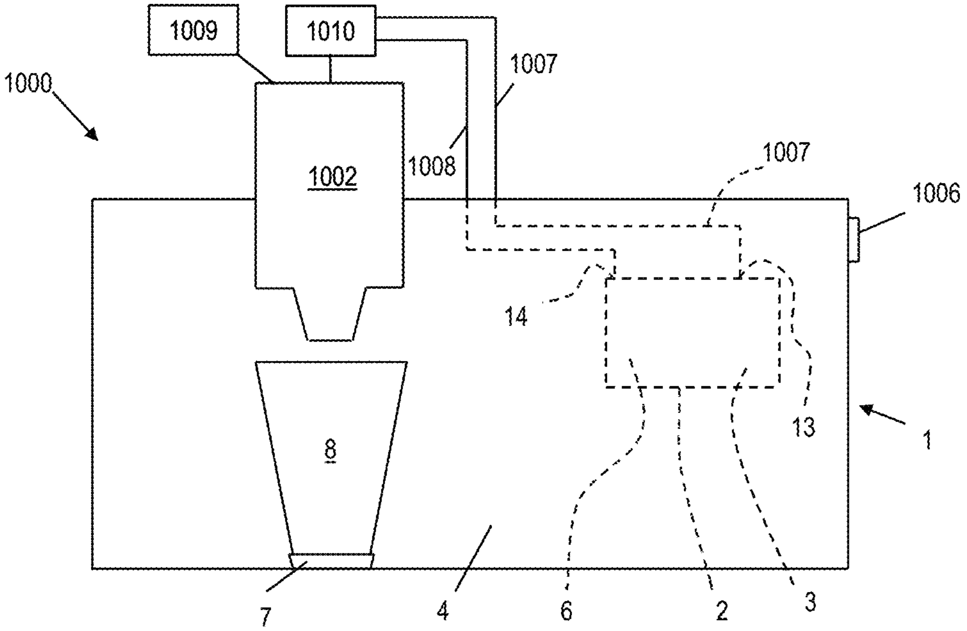
FIG. 3 shows a schematic drawing of a front view of a first embodiment of a beverage dispensing machine with the adapter of the present disclosure connected thereto.

Board 2 has a reader 3 on or connected thereto, switch 5, and a processor 6 on board 2. Board 2 is connected to splash panel 4. As in FIG. 3, one of lines 1007 and 1008 is a "hot" line that provides power, for example 120 VAC, while the other is neutral. In the shown embodiment, line 1008 is the powered "hot" line, and line 1007 is neutral. G is the ground line. To install adapter 1 in beverage 1000, a user or installer simply detaches lines 1007 and 1008 from keyport 1006 and connects them to board 2. In FIG. 3, line 1007 is connected to a first point 13 on board 2, and line 1008 is connected to a second point 14 on board 3. Other beverage dispenses may have different electrical configurations. Adapter 1 of the present disclosure is suitable to be used on any beverage dispenser that has a locking circuit to control the functioning of beverage dispensing valves. In the embodiment of FIG. 3, keyport 1006 is disconnected from the circuitry of machine 1000 entirely, and thus no longer can affect whether beverages are dispensed. The present disclosure contemplates an embodiment where one or both of lines 1007 and 1008 are disrupted and connected to board 2 in such a way that keyport 1006 is still functional and connected to the circuitry of machine 1000.

A user has a cup 7 to receive beverages. The user will employ one or more credential technologies to communicate to reader 3 that the user is authorized to receive beverages and/or ice. This credential can include any technology suitable for establishing the identity of a user. The credential may be a communication device 8 embedded or attached to cup 7. Communication device 8 can be, for example, a transceiver. Device 8 can employ one-way (e.g. transmitter or receiver) or two-way communication. The present disclosure contemplates communication technologies such as but not limited to Wi-Fi, Bluetooth®, or other non-contact electronic communications. Optical readers and receivers may also be used, such as but not limited to a QR code. For example, a camera can be on a front of or behind splash panel 4. In the latter, there would be an opening in splash panel 4 through which the camera can read a code on cup 7, as discussed in greater detail below. The user may also have a mobile app belonging to the beverage dispenser or retail store, or a third-party vendor, where the user can sign in or register as attempting to acquire a beverage at a specific dispenser location. The present disclosure also contemplates using facial recognition, fingerprint technology, or voice-activated technology to grant a user permission to acquire a beverage.

Figure 4:
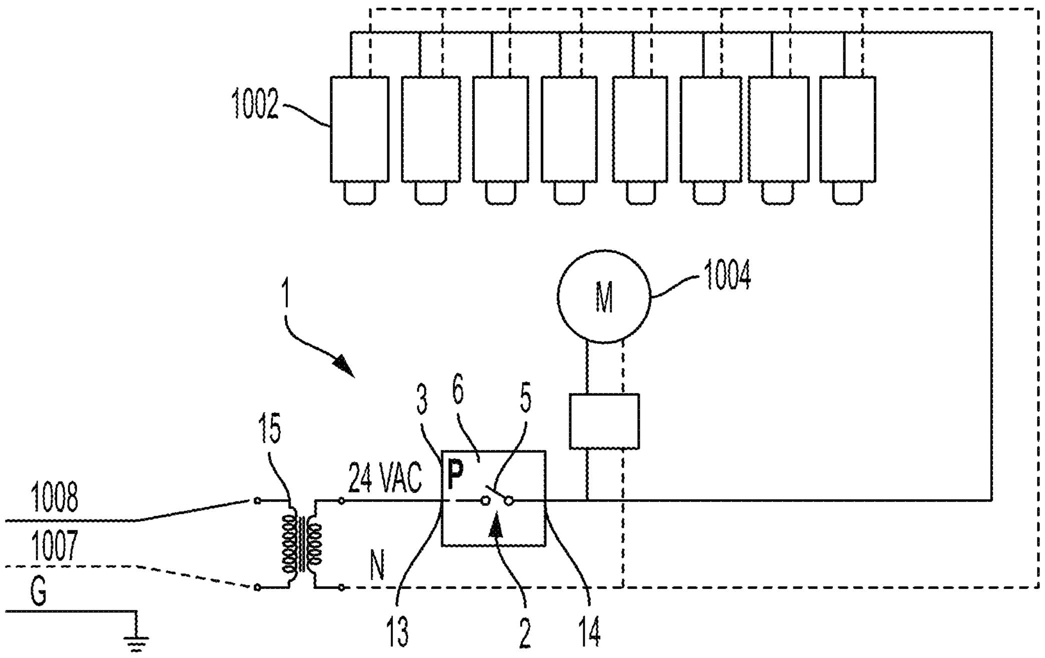
FIG. 4 shows a schematic drawing and wiring diagram of the adapter of the present disclosure when connected to a beverage machine.

Referring specifically to FIG. 4, switch 5 may be normally-open, so that when the user provides a valid credential, processor 6 closes switch 5, to allow beverage and/or ice to be dispensed into cup 7. Processor 6 may also allow switch 5 to be closed only for a certain amount of time after acknowledgement of the credential, so that unauthorized users may not access beverages and/or ice after the paying, authorized user is finished. Thus, when switch 5 is closed, the circuit including lines 1007 and 1008, board 2, switch 5, valves 1010, dispensing spouts 1002, and ice dispensing spout 1004, is complete, allowing the user to obtain beverages and/or ice. Other circuit logic is contemplated by the present disclosure. As discussed above, transformer 15 can step down a high-voltage (e.g. 120 VAC) in line 1008 into a more suitable power level for board 2 (e.g. 24 VAC). Further, while in FIG. 3 ice dispenser 1004 is shown as being connected to or controlled by adapter 1, the present disclosure contemplates an embodiment where ice dispenser 1004 is not powered off or de-energized when switch 3 is open, meaning that a user would be able to obtain ice from spout 1004 even when they cannot obtain beverage from spout 1002.

Processor 6 can keep switch 5 closed for one minute or less, thirty seconds or less, fifteen seconds or less, ten seconds or less, or seven seconds or less. In one embodiment, processor 6 keeps switch 5 open for from five to ten seconds. The flow rate of the beverage through spout 1002 can be commensurate with the desired size of the beverage sold and purchased. For example, if a twenty-four ounce beverage is sold, the flow rate of the beverage can be three ounces per second or less, when switch is open for between five and ten seconds.

As described above, to install adapter 1 of the present disclosure, a technician can simply cut into the existing locking circuit of a beverage dispensing machine 1000, and connect board 2 in that circuit. The technician may also just need to access push-on terminals (if available) in the existing circuit with a harness that can be included with adapter 1. The technician may also simply need to unplug connectors in the existing locking circuit of machine 1000, and connect them to adapter 1. The present disclosure contemplates that adapter 1 comprises circuit board 2 (with processor 6 thereon), reader 3 on or connected to board 2, and splash panel 4. An entire replacement splash panel 4 can be part of adapter 1, with board 2 and reader 3 connected to a side of splash panel 4 that would not come into contact with dispensed beverage or ice. Adapter 1 may also include a portion of a splash panel 4, or only board 2 and reader 3 and no splash panel 4. Adapter 1 may also include other necessary hardware, such as a harness, wire, or connectors.

Figure 5:
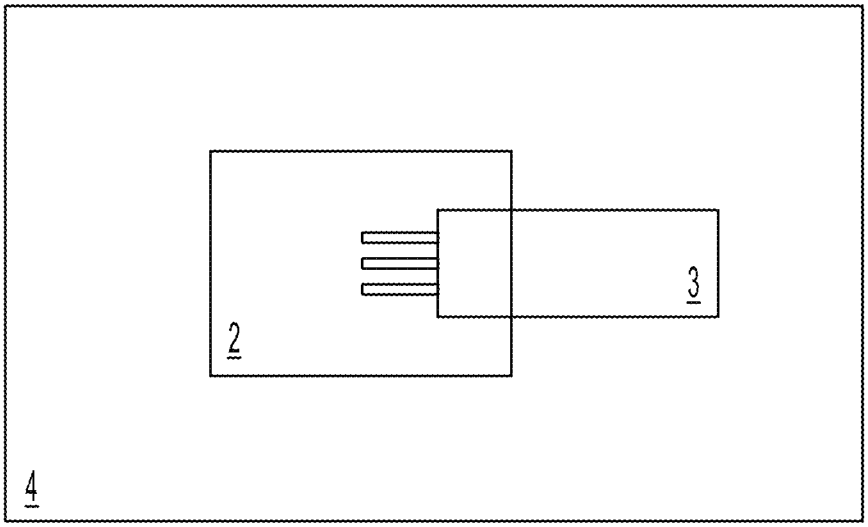
FIG. 5 shows a schematic of a reader connected to a circuit board according to the present disclosure.

Referring specifically to FIG. 5, an embodiment of adapter 1 is shown where reader 3 is removably connected to board 2 with a pin array connector, though as previously discussed reader 3 can be permanently connected to board 2. Board 2 is shown in FIG. 5 as being connected to a portion of a splash panel 4.

Figure 6:
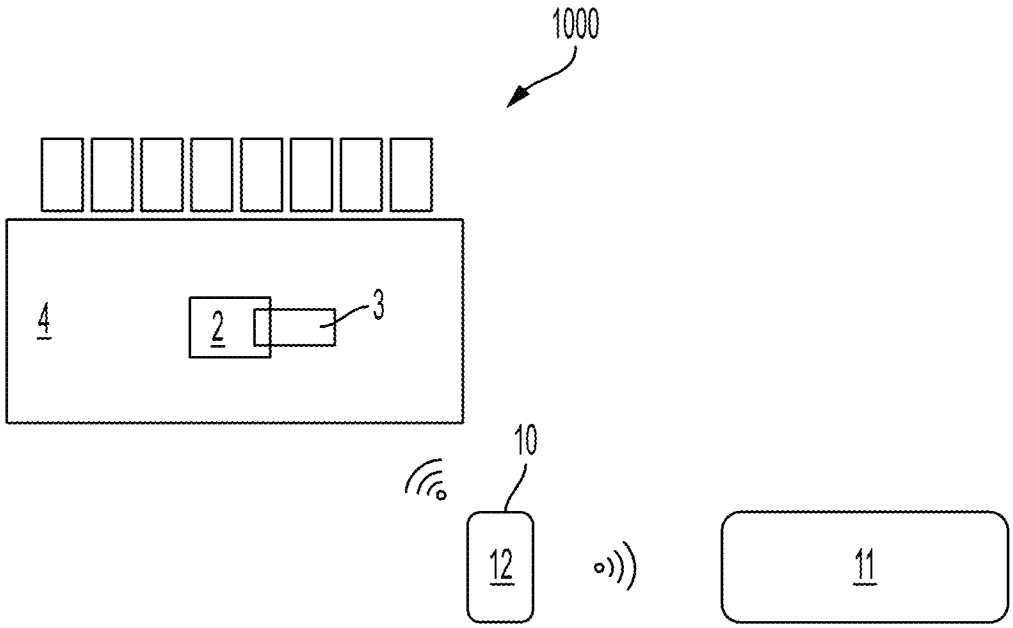
FIG. 6 shows a schematic drawing of a second embodiment of a beverage dispensing system using the adapter of the present disclosure.

Referring specifically to FIG. 6, a system is shown where adapter 1 is installed in dispenser 1000. Board 2 and reader 3 can work with a user's mobile device 10 and a remote server 11. With an app 12 on mobile device 10, the user can indicate that they wish to purchase beverages from dispenser 1000. In one embodiment, app 12 can display a series of dispensers 1000 to choose from. The user can then tell server 11 that they wish to purchase a beverage from a particular dispenser 1000. App 12 can require the user to be within a certain distance of dispenser 1000, or there can be no distance restriction. App 12 can also handle the payments required. For example, the user can load a preset amount of money onto app 12, and app 12 will only allow the user to obtain a beverage if there is enough money stored in the user's account. Adapter 1 thus allows an owner of a beverage machine to significantly upgrade the ways a user can pay for beverages.

Mobile device 10 can communicate with reader 3 in any of the ways described above with respect to the credential technologies. Mobile device 10, reader 3, and server 11 can communicate with one another using long-range communication technology, such as cellular networks, location services, or Wi-Fi, and short-range communication technology such as Bluetooth®, RFID, or Near-Field Communication (NFC). Server 11 can communicate with and can send permission to app 12, which then transmits that permission to reader 3. One advantage of the embodiment of FIG. 6 is that the user's cup 7 may not need to have any device 8 thereon, as app 12 will communicate with the server 11 and reader 3 through the communication devices on mobile device 10.

Figure 7:
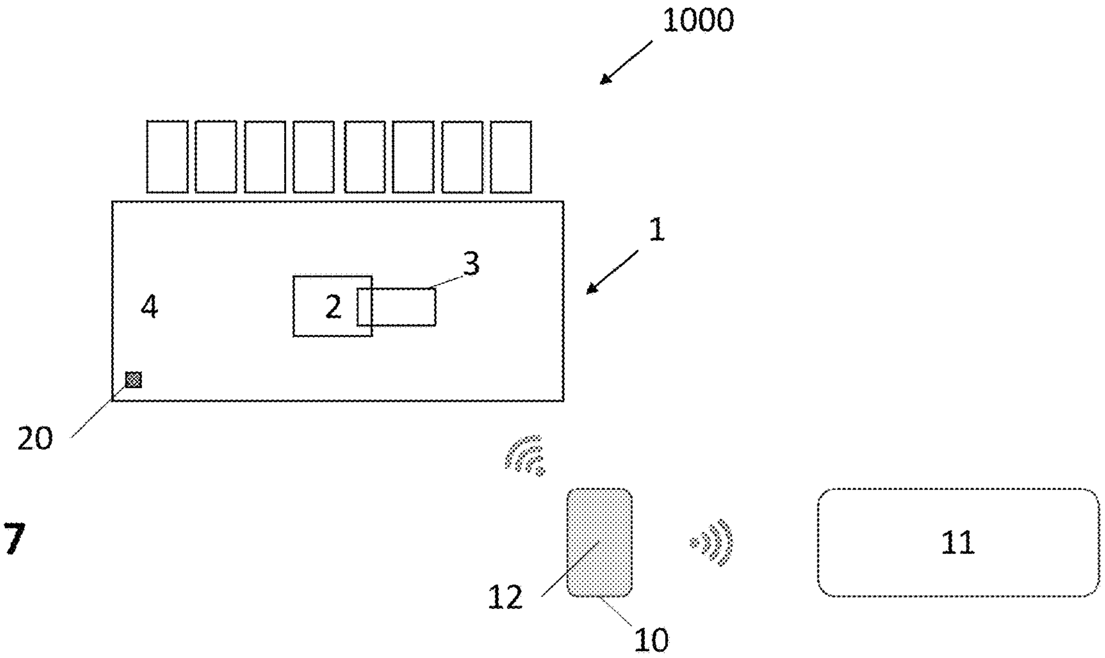
FIG. 7 shows a schematic drawing of a third embodiment of a beverage dispensing system using the adapter of the present disclosure.

Referring to FIG. 7, an embodiment of machine 1000 with adapter 1 is shown that also includes a code reader 20. Code reader 20 can be an optical reader that can read bar codes and/or two-dimensional codes such as QR codes. Code reader 20 can be used in conjunction with or as a replacement to reader 3 of prior embodiments. As previously discussed, the user can have a readable code on cup 7, which can be presented to reader 20. Alternatively, app 12 on the user's mobile phone 10 can display a readable code that the user presents to reader 20. In this embodiment, in the manner discussed in greater detail below, reader 20 will transmit the code it obtains to processor 6, which in turn determines whether the user is authorized to obtain a beverage. Code reader 20 can be located anywhere on splash panel 4.

Figure 8:
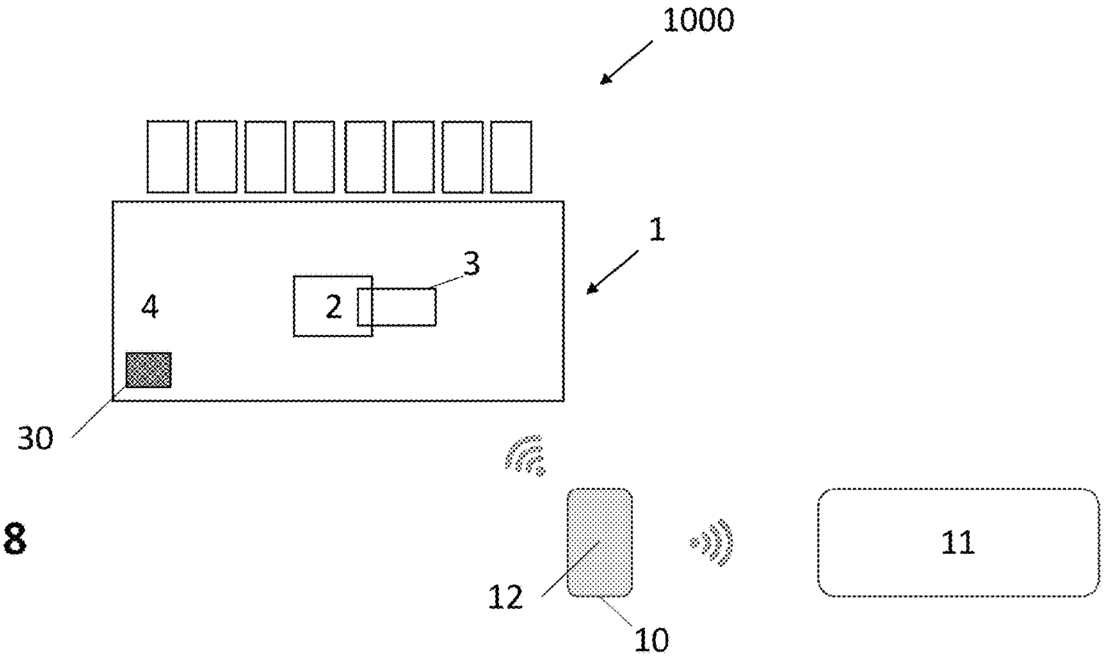
FIG. 8 shows a schematic drawing of a fourth embodiment of a beverage dispensing system using the adapter of the present disclosure.

Referring to FIG. 8, an embodiment of machine 1000 with adapter 1 is shown that includes a readable code 30 that is displayed on splash panel 4. Readable code 30 can be a bar code and/or two-dimensional code such as a QR code. In this embodiment, the user scans code 30 with a reader app on their mobile device 10. The user is then sent to a website, where they can pay for a desired amount of beverage and receive a digital token in return. This token is then transmitted to reader 3 and processor 6, where, in the manner described in greater detail below, processor 6 determines whether the user is authorized to obtain beverages.

Figure 9:
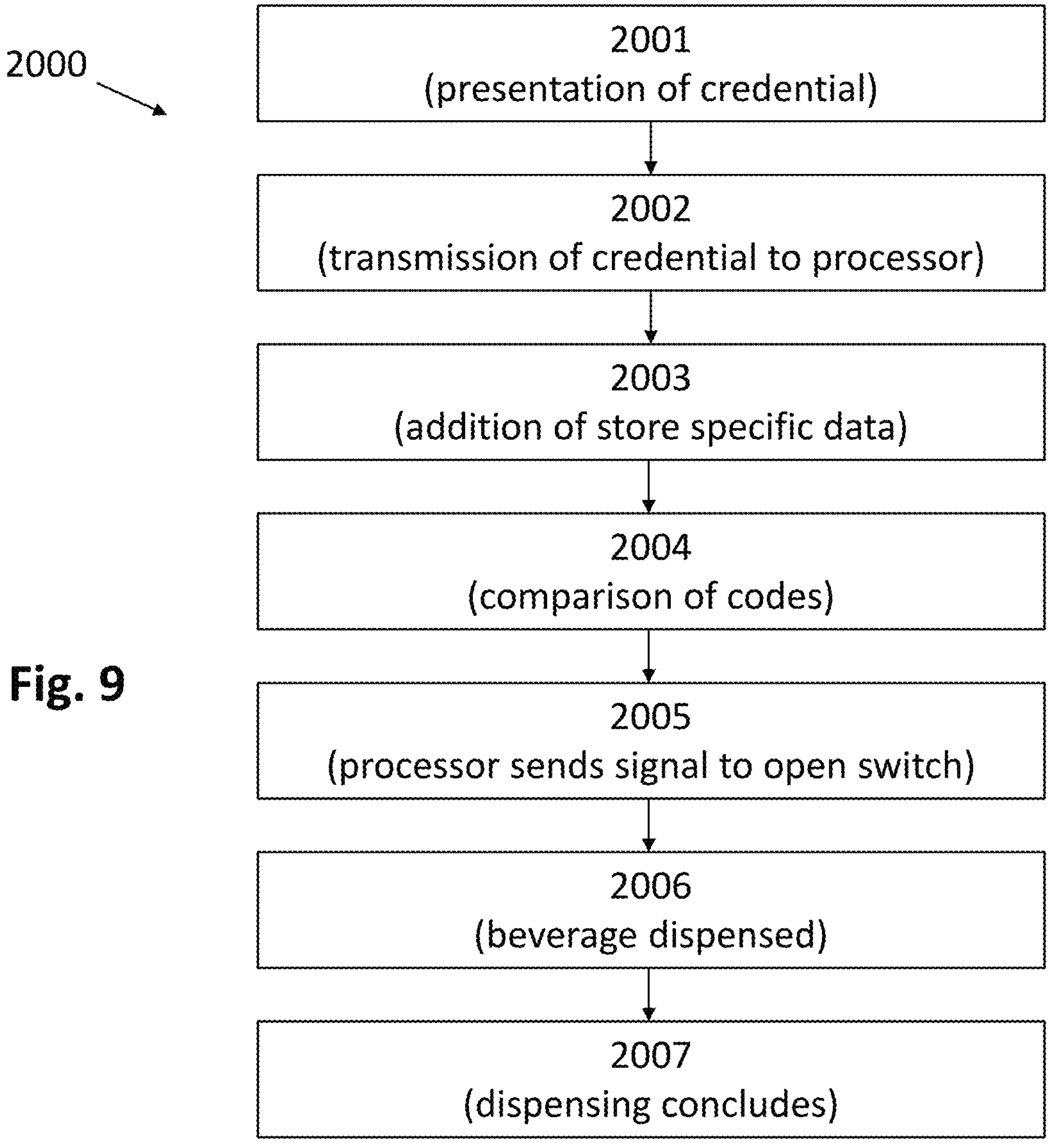
FIG. 9 shows a flow chart for a first process of the present disclosure.
Figure 10:
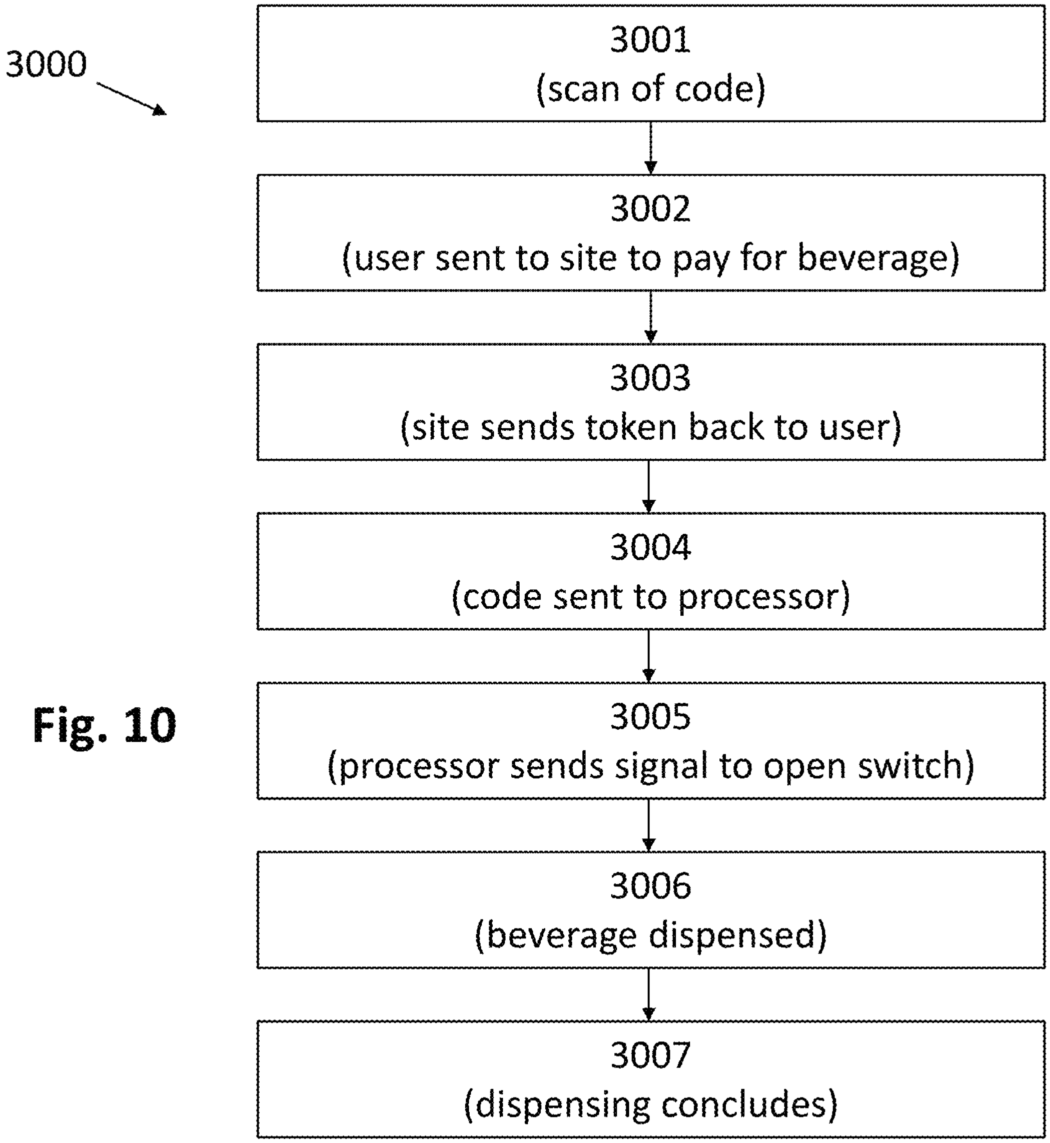
FIG. 10 shows a flow chart for a second process of the present disclosure.

Referring to FIGS. 9 and 10, processes are shown for how adapter 1 determines whether a particular user is authorized to receive beverages from machine 1000, and how the components of adapter 1 coordinate to dispense beverages to the user. In process 2000 of FIG. 9, in step 2001, a user presents their credential to machine 1000 and adapter 1. As previously discussed, the credential can be on a cup 7, or presented through an application 12 on a user's mobile phone 10. In step 2002, the reader in adapter 1 transmits information associated with the credential to processor 6. For example, in the embodiment of FIG. 7, reader 20 would scan a bar code or two-dimensional code displayed on a user's mobile phone 10 and send the information contained therein to processor 6. In the embodiment of FIG. 3, reader 3 obtains information from device 8 on cup 7, and transmits that information to processor 6.

In optional step 2003, processor 6 adds a store/chain specific number to the information obtained in step 2002. This step is to prevent the reuse of codes and to prevent a user who has a code from one store from using it in another. For example, a user may have a code associated with a rewards program at convenience store A. To prevent that user from using the same code in convenience store B, processor 6 can add store-specific information to the information obtained in step 2002. Processor 6 has a preloaded bank of acceptable codes to search. The acceptable codes will include some information relating to the user, and the store-specific information added in step 2003. In step 2004, processor 6 compares the information it receives from the user in step 2002 to the acceptable codes. One advantage to having the acceptable codes stored on processor 6 is that there is no need for a cellular or wireless network to access the acceptable codes on a remote server or cloud.

In step 2005, if processor 6 determines that there is a match between the code presented by the user and those that are stored, it sends a signal to close switch 5, allowing for a beverage to be dispensed (step 2006). As previously discussed, switch 5 can be closed for a fixed amount of time at a set flow rate, after which the pour concludes (step 2007). Switch 5 opens again, thus disrupting the circuit, de-energizing beverage valves 1010 and preventing the further dispensing of beverage until a credential is presented again (step 2001).

In FIG. 10, a flow diagram for process 3000 of the present disclosure is shown. Process 3000 is different than process 2000 in the ways set forth below. Although not limited to any particular embodiment of the present disclosure, process 3000 may be particularly well-suited to the embodiment of FIG. 8, where a code is displayed on splash panel 4. In step 3001, the user holds their mobile device (e.g., device 10) up to scan the code (e.g., code 30) on panel 4. This code then takes the user to a website, which can be owned and run by the owner of beverage machine 1000, or a third party responsible for financial transactions relating to machine 1000. At this site, the customer can pay for an amount of beverage (step 3002). The site then sends a "paid" token back to the user's mobile phone (step 3003). The paid token is then sent to processor 6 via one of the wireless protocols previously discussed (step 3004). In step 3005, processor 6 sends a signal to close switch 5, allowing for a beverage to be dispensed (step 3006). As previously discussed, switch 5 can be closed for a fixed amount of time at a set flow rate, after which the pour concludes (step 3007). Switch 5 opens again, thus disrupting the circuit, de-energizing beverage valves 1010 and preventing the further dispensing of beverage until a credential is presented again (step 3001).

Although virtually all beverage dispensers 1000 will have some sort of key-enabled locking circuit as described above, the present disclosure also contemplates a situation where an existing dispenser 1000 does not have such a locking circuit. In this case, adapter 1 can be used to interrupt any circuit that selectively allows for beverages and/or ice to be dispensed. The present disclose also contemplates machines of original manufacture using the technologies described herein for dispensing beverages, i.e. a machine where the components of adapter 1 are part of the machine when it is originally made, and do not have to be retrofitted to an existing beverage dispenser.

For ease of description, the terms "user" and "customer" refer to the person who wishes to obtain a beverage from the dispenser, for example a customer at a retail establishment. The term "owner" refers to the owner of the beverage dispenser, and "technician" to the person who will be installing adapter 1.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

What is claimed is:

1. A beverage dispensing machine, comprising:

a powered line;

a neutral line;

a valve connected to each of the powered line and the neutral line;

a beverage dispensing nozzle in fluid communication with the valve;

a circuit board, wherein the circuit board comprises a switch and a processor thereon, and a reader connected thereto, and wherein the powered line is connected to the circuit board at a first point, and the neutral line is connected to the circuit board at a second point;

an electrical circuit comprising the valve, the powered line, the neutral line, the circuit board, and the switch; and a splash panel, wherein the beverage dispensing nozzle is on a first side of the splash panel, and the circuit board with the switch and processor thereon is connected to a second side of the splash panel that is opposite the first side, wherein the reader is configured to read a credential provided by a user, wherein the processor is configured to receive the credential from the reader and compare the credential to a set of approved credentials, wherein if the credential matches one of the approved credentials, the processor is configured to set the switch to a closed position, thereby closing the electrical circuit and allowing beverage to flow through the valve and the beverage dispensing nozzle, and wherein if the credential does not match one of the approved credentials or no credential is presented to the reader, the processor is configured to set the switch to an open position, thereby opening the electrical circuit and not allowing beverage to flow through the valve and the beverage dispensing nozzle.

2. The beverage dispensing machine of claim 1, wherein the reader is enabled with a technology selected from the group consisting of Wi-Fi, Bluetooth, optical readers, and any combinations thereof.

3. The beverage dispensing machine of claim 1, wherein the reader is an optical reader.

4. The beverage dispensing machine of claim 1, wherein the reader is configured to read one- or two-dimensional codes, and the credential is a one- or two-dimensional code.

5. The beverage dispensing machine of claim 1, wherein the reader is removably connected to the circuit board.

6. A method of operating a beverage dispensing machine, the machine comprising:

a powered line;

a neutral line;

a valve connected to each of the powered line and the neutral line;

a beverage dispensing nozzle in fluid communication with the valve;

a circuit board, wherein the circuit board comprises a switch and a processor thereon, and a reader connected thereto, and wherein the powered line is connected to the circuit board at a first point, and the neutral line is connected to the circuit board at a second point;

an electrical circuit comprising the valve, the powered line, the neutral line, the circuit board, and the switch; and a splash panel, wherein the beverage dispensing nozzle is on the first side of the splash panel, and the circuit board with the switch and processor thereon is connected to a second side of the splash panel that is opposite the first side, the method comprising the steps of:

presenting a credential to the reader;

communicating the credential from the reader to the processor;

comparing the credential to a to a set of approved credentials;

if the credential matches one of the approved credentials, setting set the switch to a closed position, thereby closing the electrical circuit and allowing beverage to flow through the valve and the beverage dispensing nozzle; and if the credential does not match one of the approved credentials, setting the switch to an open position, thereby opening the electrical circuit and not allowing beverage to flow through the valve and the beverage dispensing nozzle.

7. The method of claim 6, wherein the reader is enabled with a technology selected from the group consisting of Wi-Fi, Bluetooth, optical readers, and any combinations thereof.

8. The method of claim 6, wherein the reader is an optical reader.

9. The method of claim 6, wherein the reader is configured to read one- or two-dimensional codes, and the credential is a one- or two-dimensional code.

10. The method of claim 6, wherein the setting of the switch to a closed position comprises setting the switch to a closed position for a set period of time.

11. The method of claim 6, wherein the setting of the switch to a closed position comprises setting the switch to a closed position for a set period of time of from five to ten seconds, and the method further comprises the step of:

setting the switch to the open position after the set period of time has elapsed.

12. The method of claim 6, wherein the beverage dispensing machine has a one- or two-dimensional code displayed thereon, and the method further comprises the steps of, before the presenting a credential step:

scanning the with a user device;

obtaining a token with the user device from a website, wherein the token is the credential presented to the reader.

13. The method of claim 6, the method further comprising the step of, before the comparing step:

adding additional data to the credential with the processor after the communicating step.

14. A method of retrofitting a beverage dispensing machine, the machine comprising:

a powered line;

a neutral line;

a valve connected to each of the powered line and the neutral line;

a beverage dispensing nozzle in fluid communication with the valve; and a keyport, wherein each of the powered line and the neutral line are connected to the keyport, wherein the keyport has a first position and a second position, wherein in the first position the powered line, the neutral line, the valve, and the beverage dispensing nozzle complete a first circuit, and in the second position, the first circuit is disrupted, the method comprising the steps of:

disconnecting each of the powered line and the neutral line from the keyport;

connecting the powered line to a circuit board at a first point;

connecting the neutral line to the circuit board at a second point, wherein the circuit board has a switch thereon and a reader connected thereto; and forming a second circuit comprising the valve, the powered line, the neutral line, the circuit board, and the switch, wherein the reader is configured to read a credential provided by a user, wherein the processor is configured to receive the credential from the reader and compare the credential to a set of approved credentials, wherein if the credential matches one of the approved credentials, the processor is configured to set the switch to a closed position, thereby closing the second circuit and allowing beverage to flow through the valve and the beverage dispensing nozzle, and wherein if the credential does not match one of the approved credentials or no credential is presented to the reader, the processor is configured to set the switch to an open position, thereby opening the second circuit and not allowing beverage to flow through the valve and the beverage dispensing nozzle.

15. The method of claim 14, wherein the beverage dispending machine further comprises a splash panel, wherein the beverage dispensing nozzle is on a first side of the splash panel, and the circuit board is connected to a second side of the splash panel that is opposite the first side.

16. The method of claim 14, wherein the reader is enabled with a technology selected from the group consisting of Wi-Fi, Bluetooth, optical readers, and any combinations thereof.

17. The method of claim 14, wherein the reader is an optical reader.

18. The method of claim 14, wherein the reader is configured to read one- or two-dimensional codes, and the credential is a one- or two-dimensional code.

19. The method of claim 14, wherein the reader is removably connected to the circuit board.

* * * * *